UNITED STATES PATENT OFFICE.

REX DE ORE McDILL, OF TAMPA, FLORIDA.

FOOD PRODUCT AND PROCESS FOR MAKING SAME.

1,361,079.  Specification of Letters Patent.  Patented Dec. 7, 1920.

No Drawing.  Application filed March 2, 1920. Serial No. 362,642.

*To all whom it may concern:*

Be it known that I, REX DE ORE MCDILL, a citizen of the United States, and a resident of Tampa, Florida, have invented a new and useful Food Product and Process for Making Same.

This invention is an improvement in food products and relates particularly to citrus fruit juices preserved in a dry or paste form and in the process of producing the same, use being made of all of the orange that contains in any way flavor, and that can be reconverted to its natural organic state by the addition of cold water.

A novelty of this invention is that all the flat and nonpalatable flavors are eliminated when the product is reconverted to its original liquid state. In practically all processes in use previous to this invention parts of the orange are used that give a foreign taste to the product and wherein outside substances are used, such as cellulose which makes the product lacking in pure food quality.

A feature of my invention is a preparation of the product that will look and taste like the natural fruit juice, when reconverted by the addition of water, which is accomplished by the following method;

The fruit is peeled or grated very fine just enough to remove the yellow oil cells of the fruit. This fine peel containing the oil cells is then ground to a very fine consistency and macerated with sugar approximately 1 pound of sugar being used to every pound of peel. This may be allowed to stand for a period of 12 hours or longer for future use or used immediately as hereinafter described. The juice is removed from the remaining portion of the orange and set aside for future use. The seeds are separated from the white pulp, the white pulp is boiled through several stages of water and the water drained off to remove any of the flat flavors that may be present, all of the liquids being pressed out as much as possible. The juice, the white pulp and the combination of the sugar and peel are then mixed together in the same proportion as when extracted from the fruit and then dehydrated at a temperature not to exceed 175 degrees Fahr. to a consistency of at least a sticky paste. Dehydration can be carried on until the product is bone dry with very good results but it is found that the sticky consistency retains the flavor better. Some of the steps of the process may be eliminated or fruits may be combined: For example, in making the orange product a small amount of lemon, lime or grape-fruit juice may be added, which on account of their higher acidity makes the resultant drink more palatable. In the manufacture of a grape fruit product the leached white pulp would be omitted on account of its bitterness, and in the manufacture of similar product from grapefruit or limes, both the gratings from the outside peel and the leached white pulp may be omitted. It is found by experimentation that the components should be thoroughly mixed before drying and during the drying process the mixture should be stirred occasionally in order that the natural flavor of the fruit be retained.

I claim:

1. A pure fruit food product consisting of the mixture of the juice of citrus fruit and sugar in quantity sufficient to sweeten and preserve the juice, the sugar having been dissolved in the juice and the mass dehydrated to at least a heavy paste at a temperature below 175° Fahr.

2. A pure fruit food product consisting of the mixture of the juice and grated outside peel of citrus fruit and sugar in quantity sufficient to sweeten and preserve the juice, the sugar having been dissolved in the juice and the mass dehydrated to at least a heavy paste at a temperature below 175° Fahr.

3. A pure fruit food product consisting of the mixture of the juice and grated outside peel of citrus fruit and the leached white pulp of citrus fruit, and sugar in quantity sufficient to sweeten and preserve the juice, the sugar having been dissolved in the juice and the mass dehydrated to at least a heavy paste at a temperature below 175° Fahr.

4. A process for the production of a dehydrated citrus juice food substance, comprising, admixing with the expressed juice sugar in sufficient quantity to flavor and preserve the juice and dehydrating the mass to at least a heavy paste at a temperature below 175° Fahr., the mass being agitated during the dehydrating.

5. A process for the production of a dehydrated citrus fruit juice food substance, comprising admixing with the expressed juice, grated peel and white pulp of citrus fruit, the pulp having been leached to remove the pectin and flavoring substances, sugar in sufficient quantity to flavor and preserve the juice and dehydrating the mass to at least a heavy paste at a temperature below 175° Fahr., the mass being agitated during the dehydrating.

REX DE ORE McDILL